US006687596B2

(12) United States Patent
Humerickhouse et al.

(10) Patent No.: US 6,687,596 B2
(45) Date of Patent: Feb. 3, 2004

(54) DIAGNOSTIC METHOD AND SYSTEM FOR TURBINE ENGINES

(75) Inventors: Charles Edward Humerickhouse, West Chester, OH (US); Charles Eric Lethander, Cincinnati, OH (US); Ryan Kenneth Vorwerk, Napoleon, OH (US)

(73) Assignee: General Electric Company, Schenectady, NY (US)

( * ) Notice: Subject to any disclaimer, the term of this patent is extended or adjusted under 35 U.S.C. 154(b) by 312 days.

(21) Appl. No.: 09/944,667

(22) Filed: Aug. 31, 2001

(65) Prior Publication Data

US 2003/0045992 A1 Mar. 6, 2003

(51) Int. Cl.7 .......................... G06F 11/00; F02M 25/07
(52) U.S. Cl. ........................ 701/100; 701/101; 73/116; 340/439
(58) Field of Search .................... 701/100, 54, 101, 701/107, 114; 73/116; 123/568.16; 340/439; 702/183

(56) References Cited

U.S. PATENT DOCUMENTS

| | | | |
|---|---|---|---|
| 4,135,246 A | 1/1979 | McMannis | 364/551 |
| 4,215,412 A | 7/1980 | Bernier et al. | 364/551 |
| 4,280,185 A | 7/1981 | Martin | 364/506 |
| 4,402,054 A | 8/1983 | Osborne et al. | 364/554 |
| 5,018,069 A | 5/1991 | Pettigrew | 364/424.04 |
| 5,293,775 A | 3/1994 | Clark et al. | 73/116 |
| 5,408,412 A | 4/1995 | Hogg et al. | 364/424.03 |
| 5,463,567 A | 10/1995 | Boen et al. | 364/551.01 |
| 5,748,500 A | 5/1998 | Quentin et al. | 364/551.01 |
| 5,968,107 A | 10/1999 | Vogan et al. | 701/102 |
| 6,138,081 A | 10/2000 | Olejack et al. | 702/104 |
| 6,401,700 B2 * | 6/2002 | Balekai et al. | 123/568.12 |
| 6,408,259 B1 * | 6/2002 | Goebel et al. | 702/183 |

* cited by examiner

*Primary Examiner*—Thomas G. Black
*Assistant Examiner*—Arthur D. Donnelly
(74) *Attorney, Agent, or Firm*—Scott Andes; Hasse Guttag & Nesbitt LLC; Eric W. Guttag

(57) ABSTRACT

A method and system for evaluating whether faults detected during the testing of a gas turbine engine are related to the performance problems of the engine or to some other abnormality unrelated to engine performance. One performance parameter of the engine is evaluated under one performance condition to generate a first set of current engine data that is then compared to a first set of prior engine data to determine if there is an abnormality. If one is detected, this performance parameter is then evaluated under at least two different performance conditions to generate a second set of current engine data that is compared to a second set of prior engine data to determine if there is an abnormality. If one is detected, the abnormality is evaluated to see if the fault is unrelated to the performance of the engine. If one is not detected, this performance parameter is evaluated relative to at least one other performance parameter to generate a third set of current engine data that is compared to a third set of prior engine data to determine if there is an abnormality. If one is detected after this comparison of the third set of current to prior engine data, the abnormality is then evaluated to see if it is unrelated to engine performance. If one is not detected, the abnormality is then evaluated to determine if the fault is related to engine performance.

36 Claims, 12 Drawing Sheets

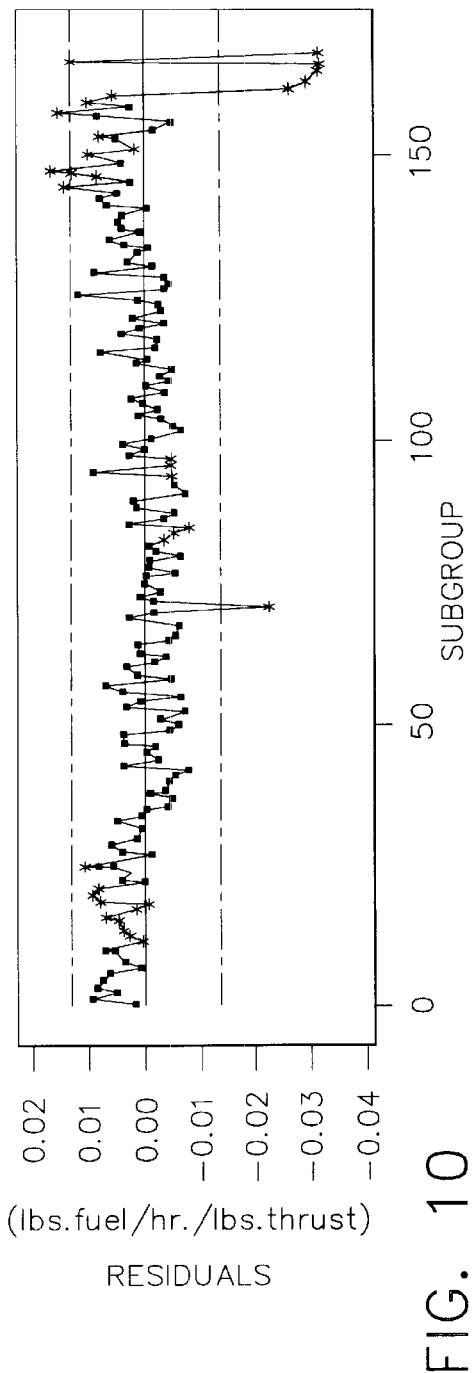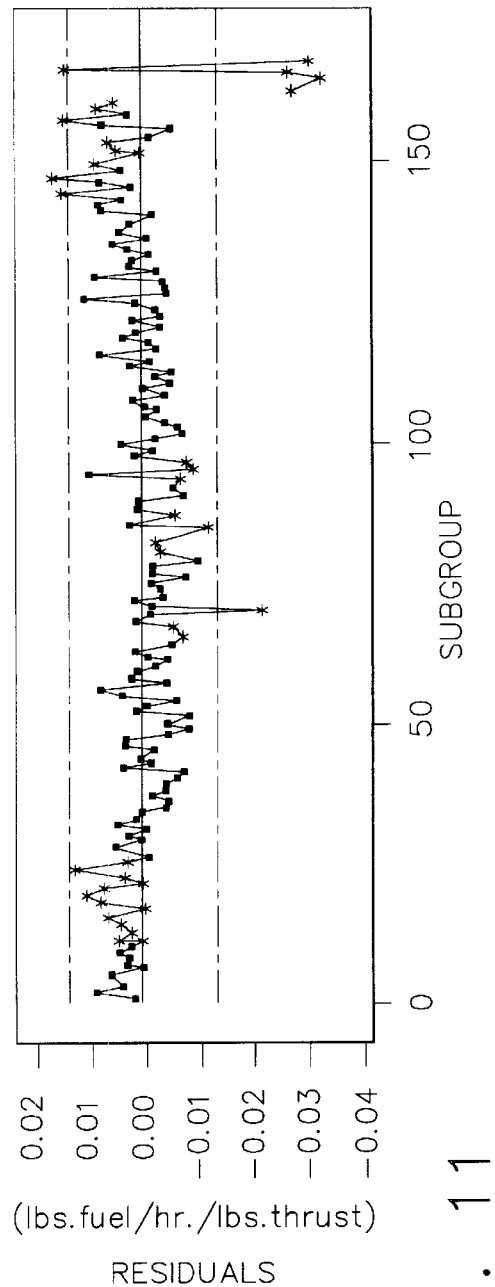

DIAGNOSTIC METHOD AND SYSTEM FOR TURBINE ENGINES

BACKGROUND OF THE INVENTION

The present invention r elates generally to a method and system for diagnosing faults in a gas turbine engine without having to rely on subjective, experience-based judgments. The present invention particularly relates to a diagnostic method and system for reliably determining whether the identified faults are related to performance problems in the g as turbine engine or to some other abnoarmality unrelated to engine performance such as faulty test equipment, incorrect calculation methods or adjustment factors, or environ mental factors.

Historically, the detection of test cell related fault s in gas turbine engines has been based on a comparison to sets of limits (minimum or maximum) for various engine performance parameters. These parameters can include engine thrust, exhaust gas temperature and fuel consumption or flow, as well as compressor rotor speeds, air flow through the engine, etc. Gas turbine engines are normally tested in a test cell to assure that the particular engine meets a defined set of limits for each specified parameter. See, for example, U.S. Pat. No. 5,293,775 (Clark et al), issued Mar. 15, 1994. Changes in these sensed parameters are identified by comparison of the parameter values measured for the current engine, relative to the values measured for other prior engines of the same or similar type.

If multiple engine performance parameters are trended, a pattern in these changes can be sufficiently distinct to allow classification (i.e., diagnosis) of a specific fault. Unfortunately, one of the problems in prior test cell diagnostic methods is that changes in the sensed parameters, changes in the test facility, changes in the engine gas path quality and the like can all impact on this capability to accurately determine whether the fault is related to the performance of the engine, or to some other abnormality unrelated to the engine. Some factors impacting on the ability to separate engine related faults, from faults unrelated to the engine, include the data acquisition or testing equipment used, the adaptive equipment for the test cell (i.e., equipment used in place of other equipment normally present when the engine is installed), as well as environmental factors (e.g., air temperature, barometric pressure and relative humidity). A further problem with engine-to-engine comparisons is data scatter (i.e., no trend line or curve can be determined within statistical limits) that can be on the same order of magnitude as the possible engine fault effects to be identified.

Existing test cell diagnostic methods are typically based on trend shift recognition of a single engine performance parameter using an outlier detection logic (i.e., checking for abnormal results that fall outside the trend line or curve as determined by the statistical deviation criteria used). While this method can be effective in identifying specific faults related to engine performance, in some instances, small changes in a single parameter can be missed or can take several sequential occurrences of such events before a specific fault can be identified as being related to engine performance. In addition, because of multiple interactions between the parameters that are sensed or measured, this prior method is not sufficiently effective in identifying whether the potential causes of the fault are engine related or involve some other problem unrelated to the engine such as those involving the test facility and associated equipment, calculation methods or adjustment factors, and environmental factors. This can lead to choosing the wrong or incorrect solution(s) to remedy the supposed cause of the fault.

One reason analysis of these faults has not previously been sequential is because not all of the available information or data is, or can be, incorporated into the analysis. As a result, corrections of the fault are not based on an objective evaluation of the substantive data. Instead, fault diagnosis and correction becomes a subjective judgment requiring a significant amount of experience to choose between possible causes of the detected fault, i.e., is it engine or nonengine related? This makes diagnosis of test cell faults not only more hit-and-miss, but also unusable, or at least not easily usable, by those without the experience with engine performance problems or test cell fault analysis.

Accordingly, it would be desirable, therefore, to have a test cell diagnostic method that provides sequential statistical analysis of multiple gas turbine engine performance parameters and performance conditions, provides reliable identification of whether test cell faults are related to performance problems in the gas turbine engine, or to some other abnormality unrelated to engine performance, provides the ability to incorporate all available prior information or data into the test cell fault analysis, and does not require subjective judgments based on a significant amount of experience with engine performance problems or test cell fault analysis.

SUMMARY OF THE INVENTION

The present invention relates to a method and system for reliably diagnosing or evaluating whether faults detected during the testing of a gas turbine engine, particularly in a test facility such as a test cell or stand, are related to the performance problems of the engine or to some other abnormality unrelated to engine performance. The method of the present invention comprises the steps of and the system of the present invention is capable of:

(A) evaluating one performance parameter of the engine under one performance condition to generate a first set of current engine data;

(B) comparing the first set of current engine data to a first set of prior engine data for the one performance condition of the one performance parameter to determine if there is an abnormality;

(C) if an abnormality is detected after comparing the first set of current engine data to the first set of prior engine data, evaluating the one performance parameter under at least two different performance conditions to generate a second set of current engine data;

(D) comparing the second set of current engine data to a second set of prior engine data for the at least two different performance conditions of the one performance parameter to determine if there is an abnormality;

(E) after comparing the second set of current engine data to the second set of prior engine data to determine if there is an abnormality:
  (1) if an abnormality is detected, evaluating whether the abnormality is a fault unrelated to the performance of the engine;
  (2) if an abnormality is not detected, evaluating the one performance parameter relative to at least one other engine performance parameter under at least one performance condition to generate a third set of current engine data;

(F) comparing the third set of current engine data to a third set of prior engine data for the at least one other engine performance parameter under at least one performance condition to determine if there is an abnormality;

(G) after comparing the third set of current engine data to the third set of prior engine data to determine if there is an abnormality:
  (1) if an abnormality is detected, evaluating whether the abnormality is a fault unrelated to the performance of the engine;
  (2) if an abnormality is not detected, evaluating whether the abnormality detected in step (C) is a fault related to performance of the engine.

The method and system the present invention provides a number of benefits and advantages, especially with regard to prior test cell diagnostic methods that rely on analysis of a single engine performance parameter. The method and system of the present invention permits the sequential statistical analysis of multiple gas turbine engine performance parameters and performance conditions for greater accuracy and reliability in diagnosing what the fault is related to. In particular, the method and system of the present invention permits reliable identification of whether the faults detected are related to performance problems in the gas turbine engine, or to some other problem or abnormality unrelated to engine performance such as those involving the test facility and associated equipment, calculation methods or adjustment factors, and environmental factors. The method and system of the present invention provides the ability to incorporate as much as is possible or practicable of the available prior information or data used as the reference point for determining whether the fault(s) detected are related (or unrelated) to engine performance. The method of the present invention also permits objective judgments of what the detected fault is related to without the need for significant amounts of experience with engine performance problems or fault analysis.

BRIEF DESCRIPTION OF THE DRAWINGS

FIG. 10 is a representative horizontal line plot of the differences (residuals) in SFC TKOF values at EGT MAR obtained from the fitted line plot of FIG. 8.

FIG. 11 is a representative horizontal line plot of the differences (residuals) in SFC MCT values at EGT MAR obtained from the fitted line plot of FIG. 9.

DETAILED DESCRIPTION OF THE INVENTION

Figure 1:
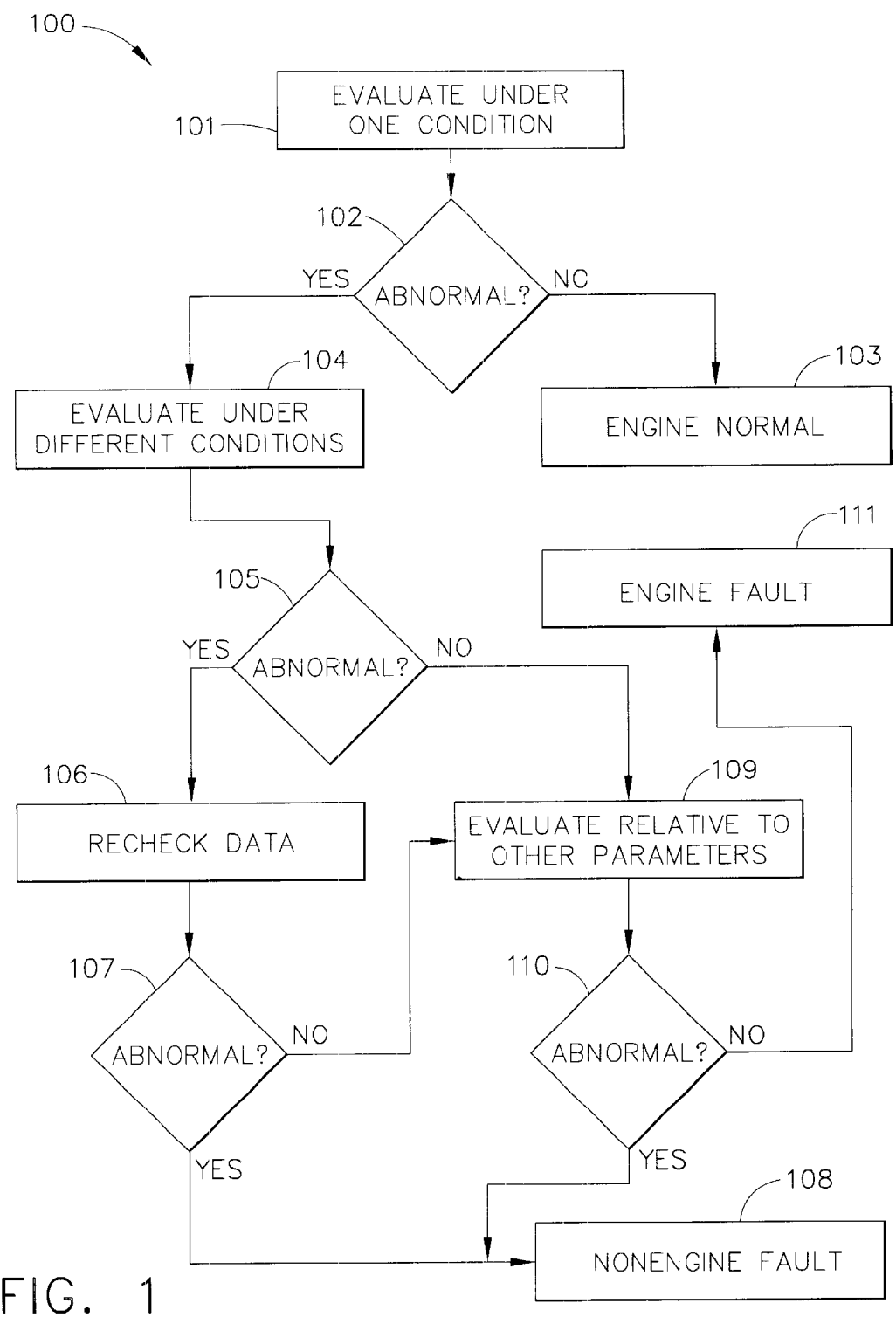
FIG. 1 is a flowchart showing the basic steps comprising the diagnostic method of the present invention.

As used herein, the term "engine performance parameter" refers to those parameters that are used to measure the performance of a gas turbine engine. Gas turbine engine performance parameters that can be evaluated by the method of the present invention include, but are not limited to, exhaust gas temperature (EGT), engine thrust (FN), specific fuel flow or consumption (SFC), compressor or fan rotor speeds ($N_x$), engine air flow ($W_a$), bleed flow ($W_b$), cooling flow ($W_c$), leakage flow (Wl), thrust at rated power (TRP), compression pressure ratio (CPR), turbine pressure ratio (TPR), fan pressure ratio (FPR), engine pressure ratio (EPR), turbine clearance control (TCC), fuel flow divided by Ps3 (WFQP3), compression temperature ratio (CTR), variable stator angle (VSV), variable bleed door position (VBV), vibration, oil consumption, acceleration time, etc.

As used herein, the term "engine performance condition" refers to those conditions under which the engine performance is evaluated. For the method of the present invention, engine performance conditions typically relate to engine power levels (e.g., takeoff power, maximum continuous power, idle, partial power, special power settings, etc.).

As used herein, the term "engine related fault" refers to any fault that is detected that is related to the performance of the gas turbine engine being evaluated. Examples of engine related faults include, but are not limited to, those due to engine performance parameters such as VSV, VBV, $W_b$, $W_c$, Wl, flow and efficiency of the engine (e.g., $W_a$), clearance control systems, etc.

As used herein, the term "nonengine related fault" refers to any fault that is detected that is unrelated the performance of the gas turbine engine being evaluated. Examples of nonengine related faults include, but are not limited to, those due to engine inlet temperatures ($T_2$) and pressures ($P_2$), fuel temperature ($T_{fuel}$), fuel lower heating value (LHV), data acquisition or testing equipment used in evaluating the engine (including failure to properly calibrate such equipment), adaptive equipment used in the test cell (i.e., equipment used in place of other equipment normally present when the engine is installed) such as adaptive equipment leakage ($W_{leak}$), inlet baffles, vortex grid, augmentor, etc., environmental factors such as air temperature, barometric pressure and relative humidity (Hum), statistical and calculation methods to generate or analyze data, adjustment factors used to compensate for known variations in test cells and equipment (CF).

As used herein, the term "current engine data" refers to engine data that is generated and collected from the gas turbine engine that is currently being evaluated.

As used herein, the term "prior engine data" refers to engine data preiously generated and collected from gas turbine engines that are used as the reference point for comparing the current engine data. The gas turbine engines from which this prior engine data are collected are typically the same or similar to the gas turbine engine being evaluated in the test cell.

As used herein, the term "analyzer" refers to the individual (or group of individuals) who are evaluating the performance of the gas turbine engine.

As used herein, the term "host computer" refers to a computer system (or systems), typically a server computer (s) but also possibly a main frame computer(s), that can be used to store the prior engine data, can have software residing thereon for analyzing, comparing and otherwise processing the data, and which is accessible from, or in communication with, the analyzer workstation and the test cell.

As used herein, the term "analyzer workstation" refers to a terminal, computer or other electronic device that is normally used by the analyzer as the means to access the host computer.

As used herein, the term "test cell" refers to the facility (indoor, outdoor or combination thereof) and the associated equipment where the engine is subjected to testing for the purpose of evaluating its performance.

As used herein, the term "transmission" refers to any type of transmission that can be carried out electronically be wired methods, wireless methods or combinations thereof. Typical electronic transmissions within the scope of the present invention can be carried out by a variety of remote electronic transmission methods, such as by using Local or Wide Area Network (LAN or WAN)-based, Internet-based, or web-based transmission methods, cable television or wireless telecommunications networks, or any other suitable remote transmission method.

As used herein, the term "software" refers to any form of programmed machine-readable language or instructions (e.g., object code) that, when, loaded or otherwise installed, provides operating instructions to a machine capable of reading those instructions, such as a computer or other computer program reader. Software useful in the present invention can be stored or reside on, as well as be loaded or installed from, one or more floppy disks, CD ROM disks, hard disks or any other form of suitable non-volatile electronic storage media. Software useful in the present invention can also be installed by downloading or other form of remote transmission.

As used herein, the term "comprising" means various components, capabilities and/or steps can be conjointly employed in the present invention. Accordingly, the term "comprising" encompasses the more restrictive terms "consisting essentially of" and "consisting of."

The method of the present invention can best be understood by reference to the flowchart shown in FIG. 1 which is indicated generally as 100. Referring to FIG. 1, in initial step 101, the first set of current engine data that is generated and collected during the evaluation of the gas turbine engine in the test cell relates to one particular engine performance parameter under one engine performance condition. For example, the particular engine performance parameter of the engine evaluated in step 101 could be the exhaust gas temperature (EGT) of the engine at a particular power setting (the engine performance condition), for example, the engine operating at a power level equivalent to takeoff (TKOF). For the purpose of illustrating the method of the present invention, the remaining steps 102 to 111 shown in FIG. 1 will also be discussed with reference to EGT as the initial engine performance parameter, with the power level at which the engine operates being the engine performance condition(s). However, it should be understood that method of the present invention illustrated by flowchart 100 in FIG. 1 can be applied to other engine performance parameters that are initially evaluated in step 101 under engine performance conditions other than power level.

In step 101, the first set of current engine data is generated and collected by evaluating the EGT of the engine at a takeoff power level, typically as a single data point. In step 102, this first set of current engine data is then compared to a first set of prior engine data that has been previously collected and generated from other EGT evaluations of gas turbine engines at a power level equivalent to takeoff, and is typically a plurality data points. This comparison is typically carried out by graphically plotting horizontally across (i.e., from left to right) the individual values of the current engine data and the prior engine data by date collected, with the earliest (older) data being on the left most side of the plot and the latest (most recent) data being on the right most side of the plot. As a result, the individual value for the current engine data will usually appear on the right most side of the plot (commonly referred to as a "run chart"). A statistical analysis is then typically run on this data plot to determine the center line of the data plot, and what the statistical control limits (SCL) below and above the center line are based on established statistical criteria (e.g., $2\sigma$ above or below center line). If the value for the current engine data is found to be within the SCL (the answer to "Abnormal?" in step 102 is "No"), this typically reflects an engine having an acceptable EGT performance, as shown in step 103 (Engine Normal).

Figure 2:
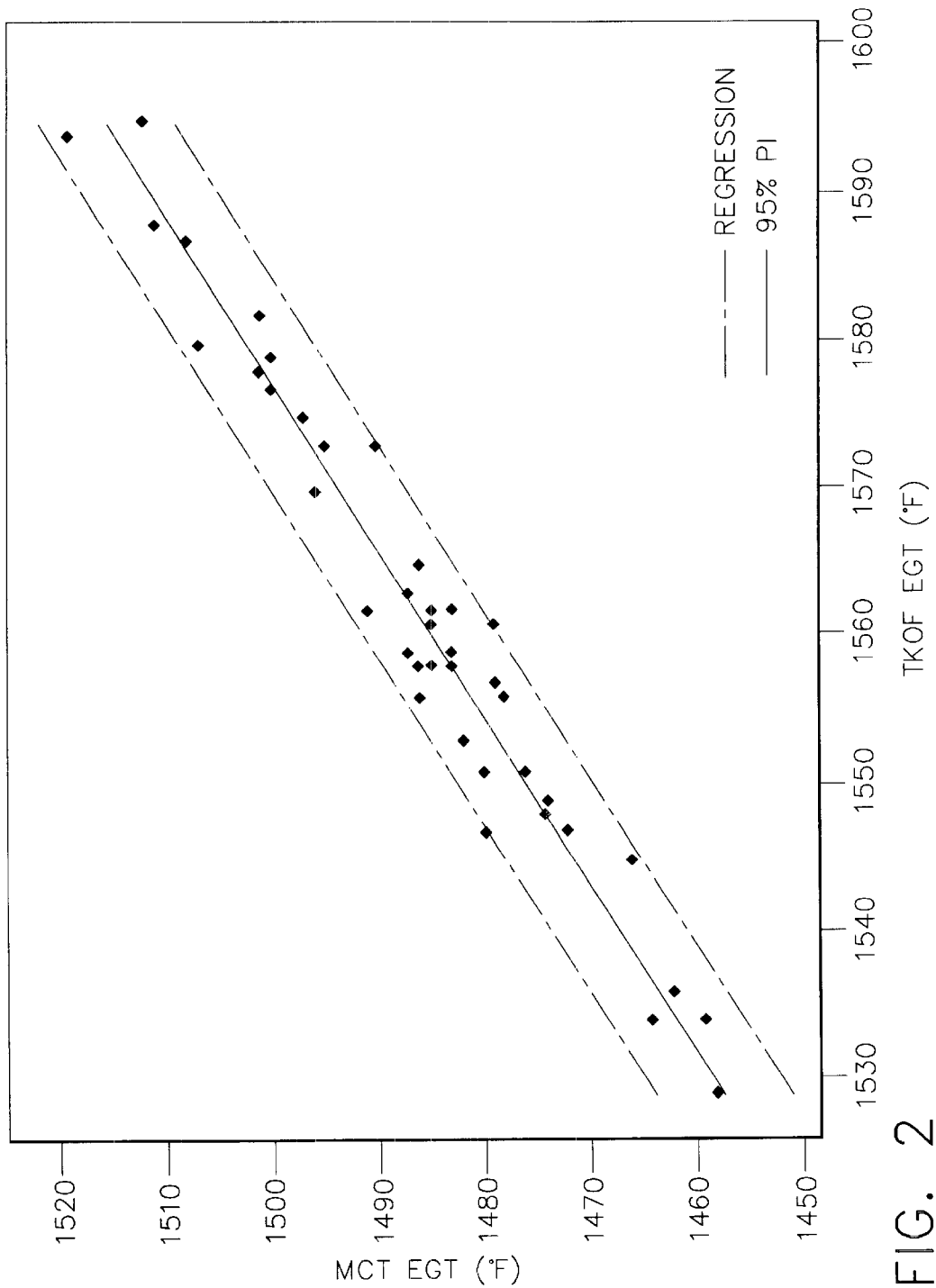
FIG. 2 is a representative fitted line plot of EGT values generated at a take of power level (TKOF) versus EGT values generated at a maximum continuous power level (MCT).

If the value for the current engine data is found to be outside the accepted limits (the answer to "Abnormal?" in step 102 is "Yes"), this does not necessarily mean that the EGT of the engine is outside acceptable limits, i.e., is related to an engine fault. Instead, as shown by step 104, the EGT of the engine is evaluated in the test cell under at least two different power levels. For simplicity of plotting, the EGT of the engine is typically evaluated at just two different power levels. For example, one power level could correspond to takeoff conditions, while the other power level could correspond to maximum continuous conditions. A second set of current engine data is generated and collected and is then compared in step 105 to a second set of prior engine data that has been previously generated and collected from other EGT evaluations at these two different power levels. For example, this comparison can be carried out by plotting the EGT values generated at the take off power level (EGT TKOF) versus the EGT values generated at the maximum continuous power level (EGT MCT). An EGT fitted line plot can then be obtained by carrying out a regression analysis on the plotted data points of the second set of current engine data and the second set of prior engine data. See FIG. 2 which shows a representative fitted line plot of EGT values generated at a maximum continuous power (MCT) level (y-axis) versus EGT values generated at a take off (TKOF) power level (x-axis). (In FIG. 2, the solid line represents the center line (regression) obtained for the plot; the dotted-dashed line represent the 95% prediction level (95% PI) of the plot.)

Figure 3:
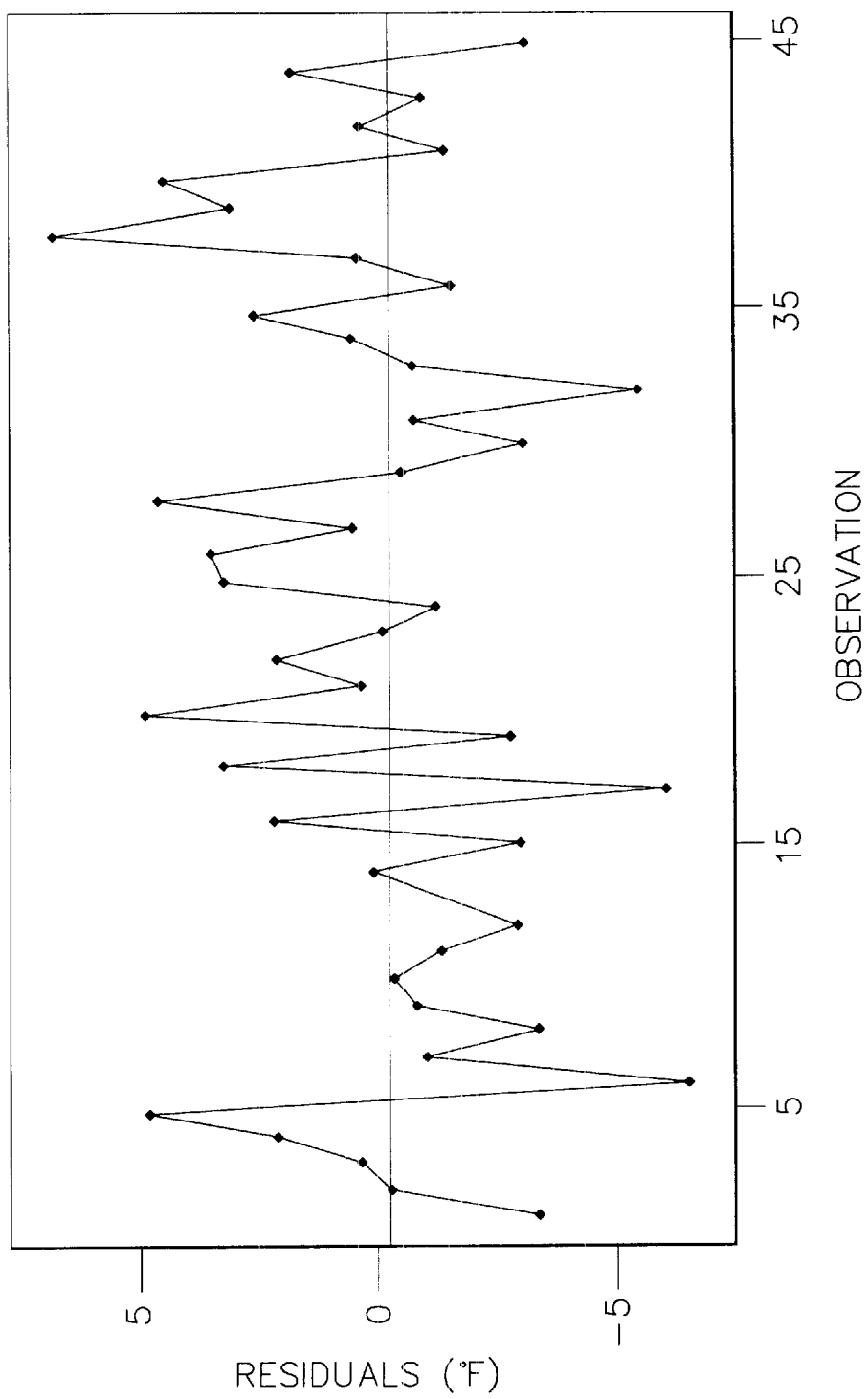
FIG. 3 is a representative horizontal line plot of the differences (residuals) in EGT values from the fitted line plot of FIG. 2.

The differences (residuals) for each of the data points of the current and prior engine data from the EGT fitted line plot (i.e., the residual above or below the center line) are then typically plotted horizontally across as individual data points. The earliest (older) data point or observation is typically on the left most side of the plot with the latest (most recent) data point or observation being on the right most side of the plot; again, the data point for the current engine data will usually appear on the right most side of the horizontal plot (hereafter referred to as the "residual EGT plot"). See FIG. 3 which shows a representative horizontal line plot of the differences (residuals) in EGT values (y-axis) obtained from the fitted line plot of FIG. 2 versus the particular observation number (x-axis).

If the EGT fitted line plot and the trend of the residual EGT plot are found not to be in agreement using established criteria (the answer to "Abnormal?" in step 105 is "Yes"), this may be an indication that the fault detected in step 102 is unrelated to engine performance, for example, a problem in test cell, how the data is measured or calculated, environmental factors, engine stability, etc. As shown in step 106, the measurements used to collect the engine data are then rechecked, such as by selecting and using a different set data collected by other engine sensors. In step 107, the rechecked data is then evaluated (as in steps 104 and 105) to see if EGT fitted line plot and the trend of the residual EGT plot are in agreement. If they are still found to not be in agreement after the evaluation of the rechecked data (the answer to "Abnormal?" in step 107 is again "Yes"), this is a fairly certain indication that the fault detected in step 102 is one unrelated to engine performance, as shown in step 108 (Nonengine fault). An evaluation can then be carried out to determine what the cause of the this nonengine related fault is (i.e., if the cause is not already apparent).

If the EGT fitted line plot and the trend of the residual EGT plot are found to be in agreement using established criteria either initially or after rechecking the data (the answer to "Abnormal?" in step 105 or 107 is "No") this may or may not be an indication that the fault detected in step 102 is related to engine performance. Instead, as shown in step 109, the EGT of the engine is evaluated in the test cell relative to other engine performance parameters (e.g., SFC, FN, $N_x$, EAF, etc.) under one or more conditions (e.g., one or more power levels). A third set of current engine data is generated and collected and then compared in step 110 to a third set of prior engine data that has been previously generated and collected from other evaluations involving the same engine performance parameters and conditions. This comparison of the third set of current to prior engine data typically involves creating multiple fitted line and residual trend plots by procedures the same or similar to those used to obtain the EGT fitted line plot and residual EGT plot in steps 104 and 105. If the trends of the various fitted line and trend plots tend to show a lack of agreement according to established criteria (the answer to "Abnormal?" in step 110 is "Yes"), this is a fairly certain indication that the fault detected in step 102 is one unrelated to engine performance, (see step 108); an evaluation can then be carried out to determine what the cause of the nonengine related fault is if the cause is not already apparent. If the trends of the various fitted line and residual trend plots tend show agreement according to established criteria (the answer to "Abnormal?" in step 110 is "No"), this is a fairly certain indication that the fault detected in step 102 is one related to engine performance, as shown in step 111 (Engine Fault). An evaluation can then be carried out to determine what the cause of this engine fault is (i.e., if it not already apparent). For example, if the SFC/EGT plots are normal, the defect is likely to be engine related. Conversely, if the SFC/EGT plots are normal, the defect is likely to be unrelated to the engine but could be related to the engine EGT indication system which would then have to be evaluated to rule out the other possible nonengine related faults.

Figure 4:
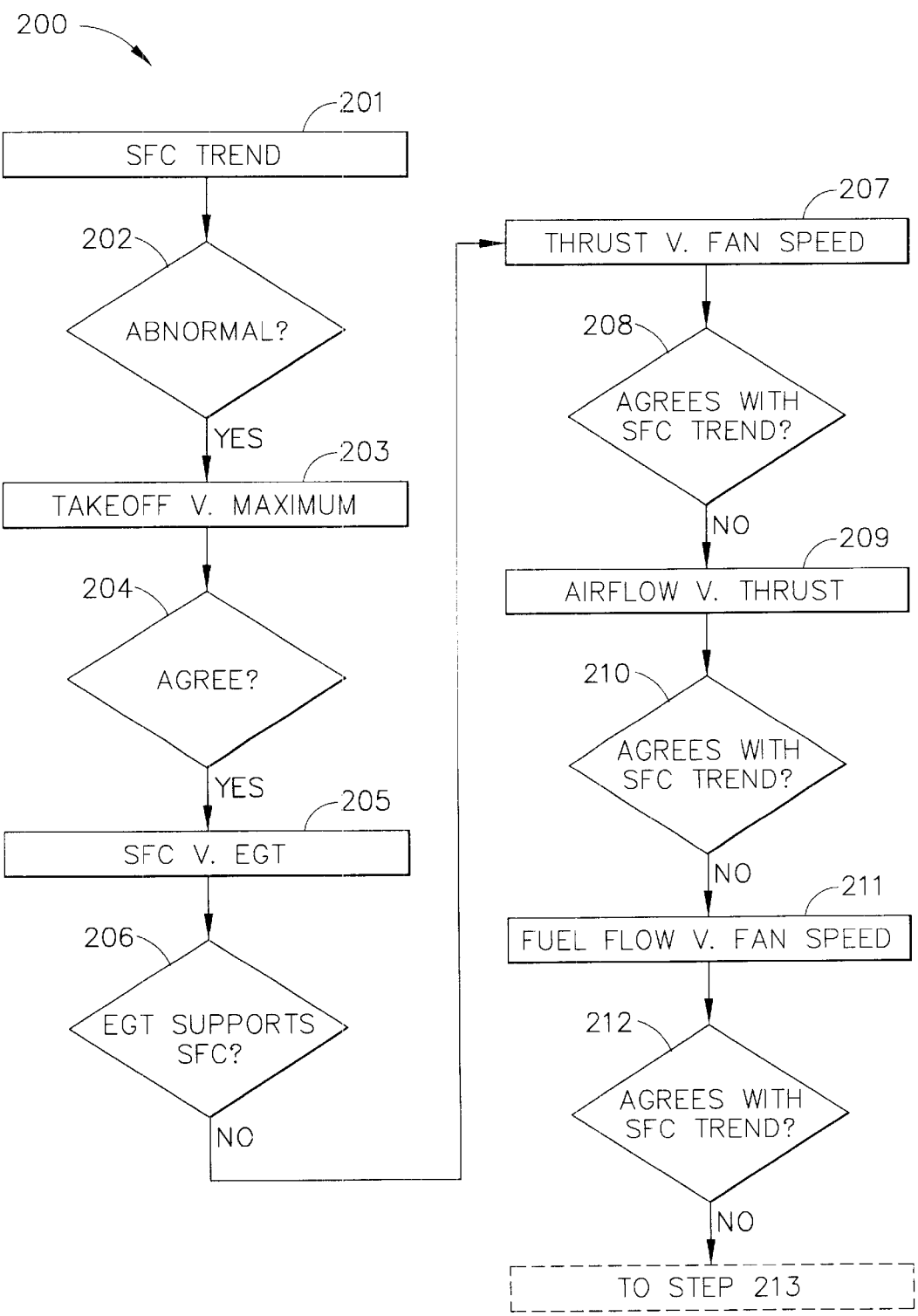
FIGS. 4 and 5 represent a flowchart illustrating an embodiment of the method of the present invention involving the analysis of a gas turbine engine where the fault detected is unrelated to engine performance.
Figure 5:
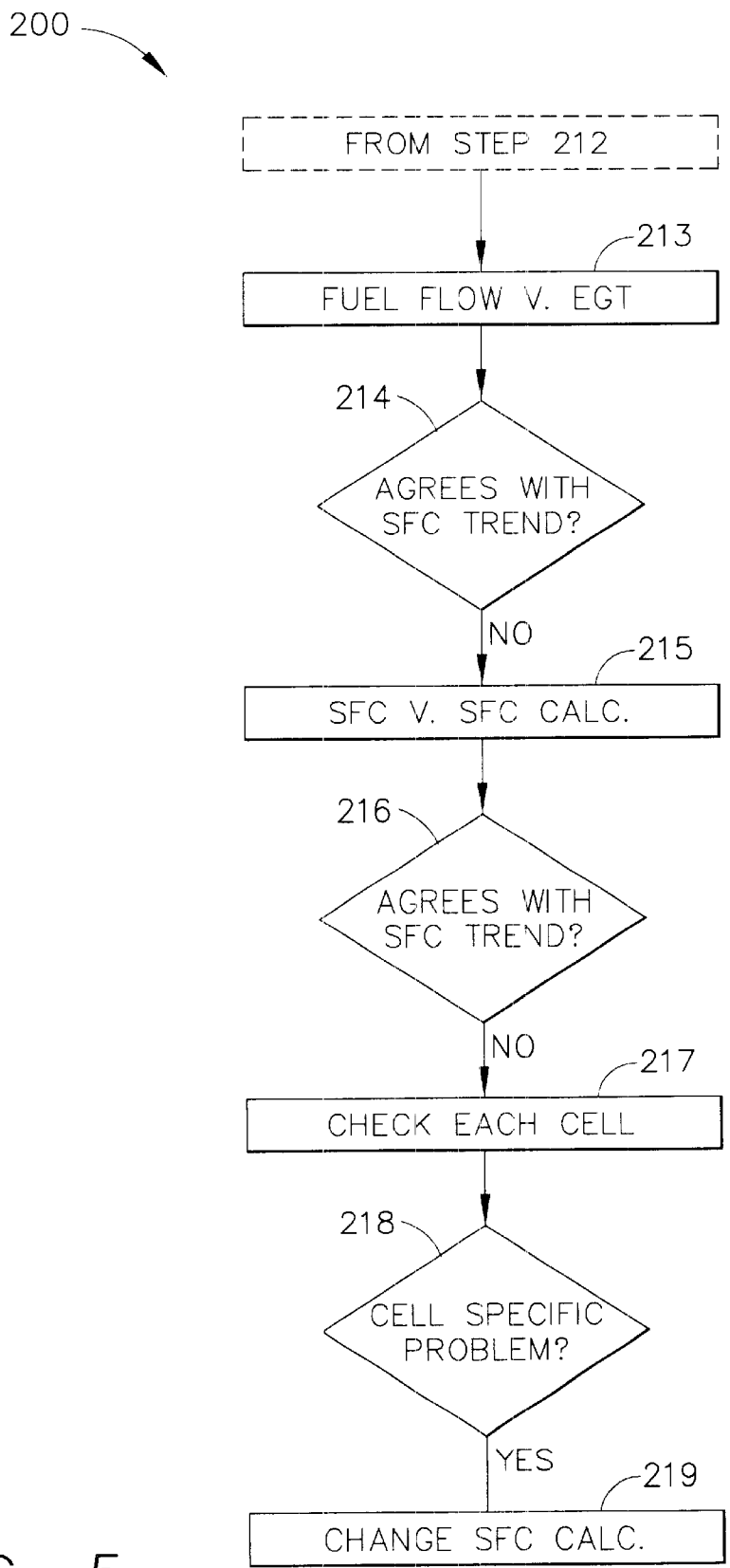
Figure 6:
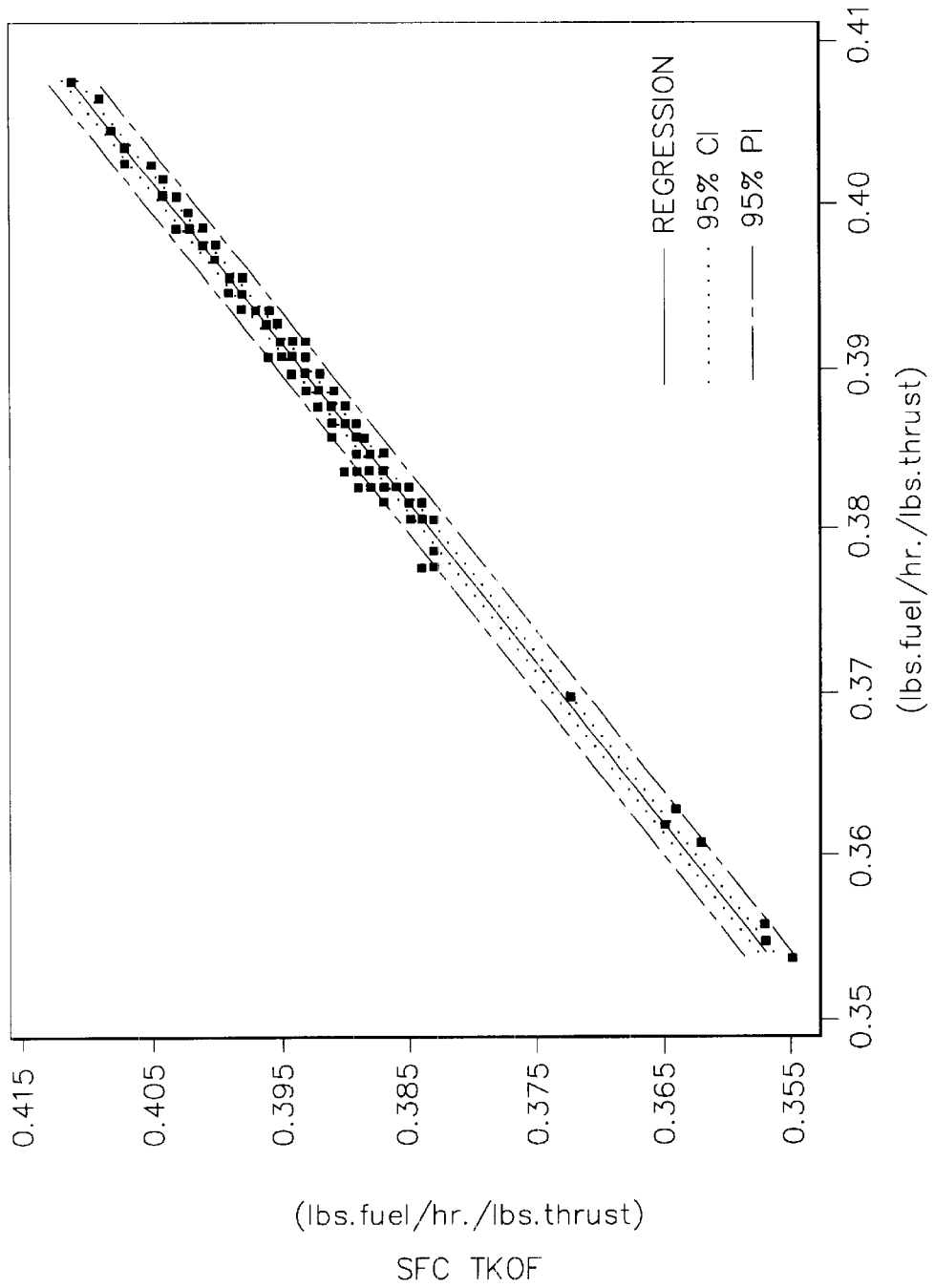
FIG. 6 is a representative fitted line plot of SFC values generated at a take off power level (TKOF) versus SFC values generated at a maximum continuous power level (MCT).
Figure 7:
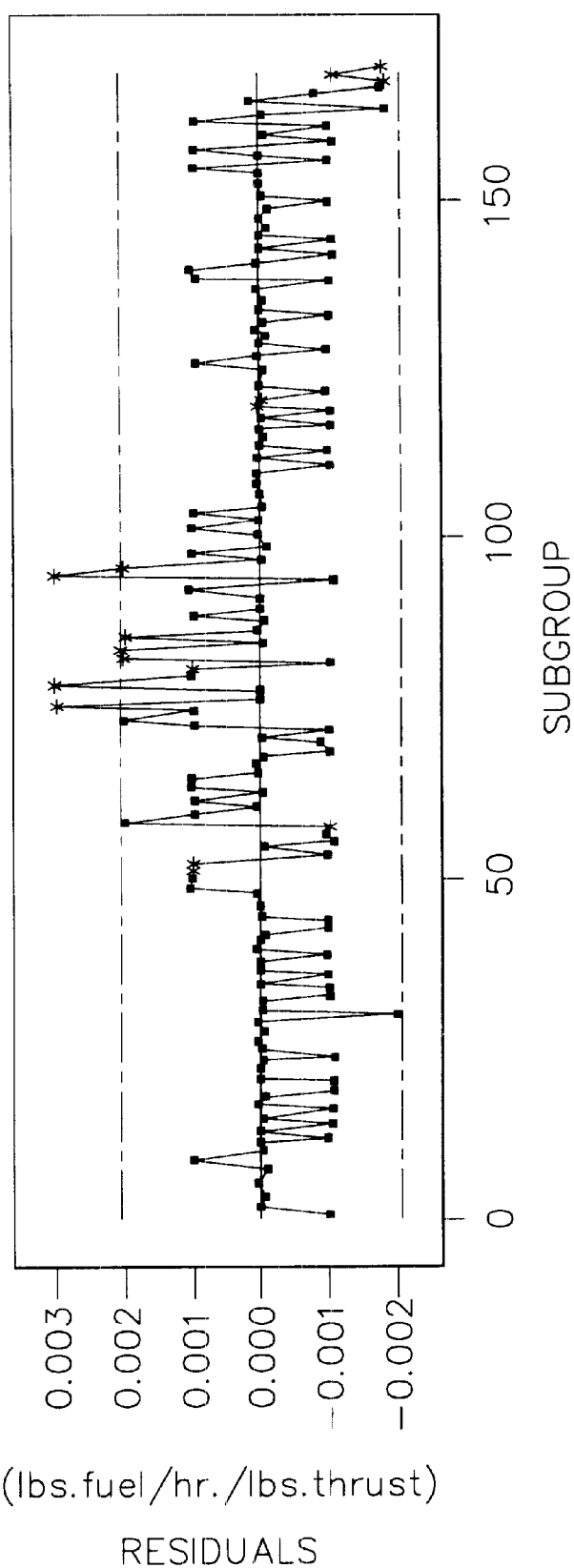
FIG. 7 is a representative horizontal line plot of the differences (residuals) in SFC TKOF values at SFC MCT obtained from the fitted line plot of FIG. 6.

The present invention can be further understood by reference to the flowchart generally indicated as step 200 in FIGS. 4 and 5 that illustrates a specific analysis of a gas turbine engine where the fault detected is unrelated to engine performance. As shown in step 201, a first set of SFC engine performance data is generated and collected for the current engine under evaluation at a single power level (takeoff). As shown in step 202, the first set of current and prior engine data is compared by a horizontal line plot (SFC trend) as before. In this instance, the SFC trend plot shows that the SFC value for the current engine data is outside SCL (the answer to "Abnormal?" is "Yes"). As shown in step 203, the SFC for the engine is then evaluated at two different power levels (take off and maximum continuous) with a second set of current engine data being generated and collected, and then compared to the second set of prior engine data as before in an SFC fitted line plot and a residual SFC plot. See FIG. 6 which shows a representative fitted line plot of SFC values generated at a take off power level (TKOF) versus SFC values generated at a maximum continuous power level (MCT). See also FIG. 7 which shows a representative horizontal line plot of the differences (residuals) in SFC TKOF values at SFC MCT (y-axis) obtained from the fitted line plot of FIG. 6 versus the particular observation number (x-axis). (In FIG. 6, the solid line represents the center line (regression) obtained for the plot; the dotted lines represent the 95% confidence level (95% CI) of the plot; the dotted-dashed lines represent the 95% prediction level (95% PI) of the plot.)

Figure 8:
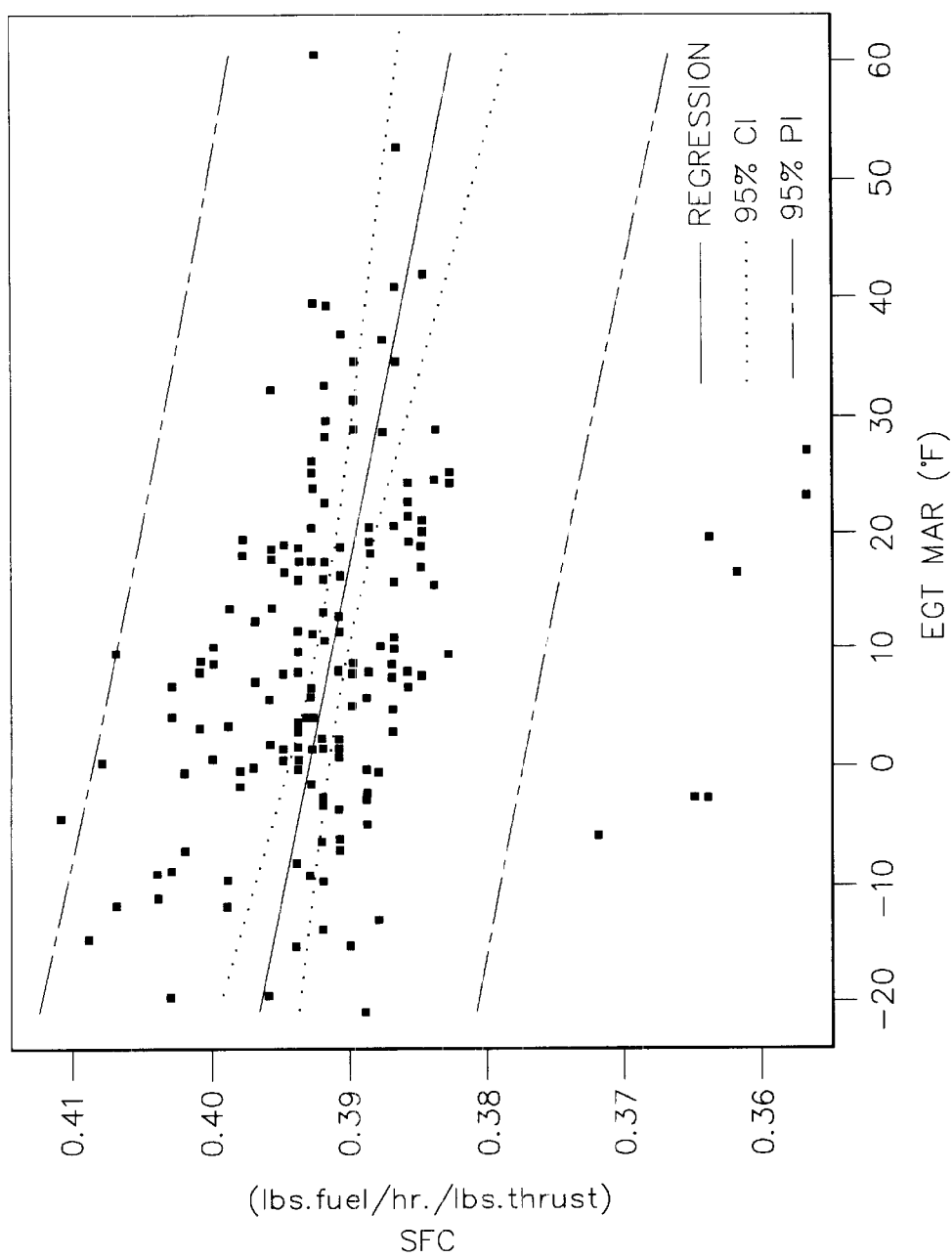
FIG. 8 is a representative fitted line plot of SFC values generated at a take off power level (TKOF) versus EGT margin (MAR) values.
Figure 9:
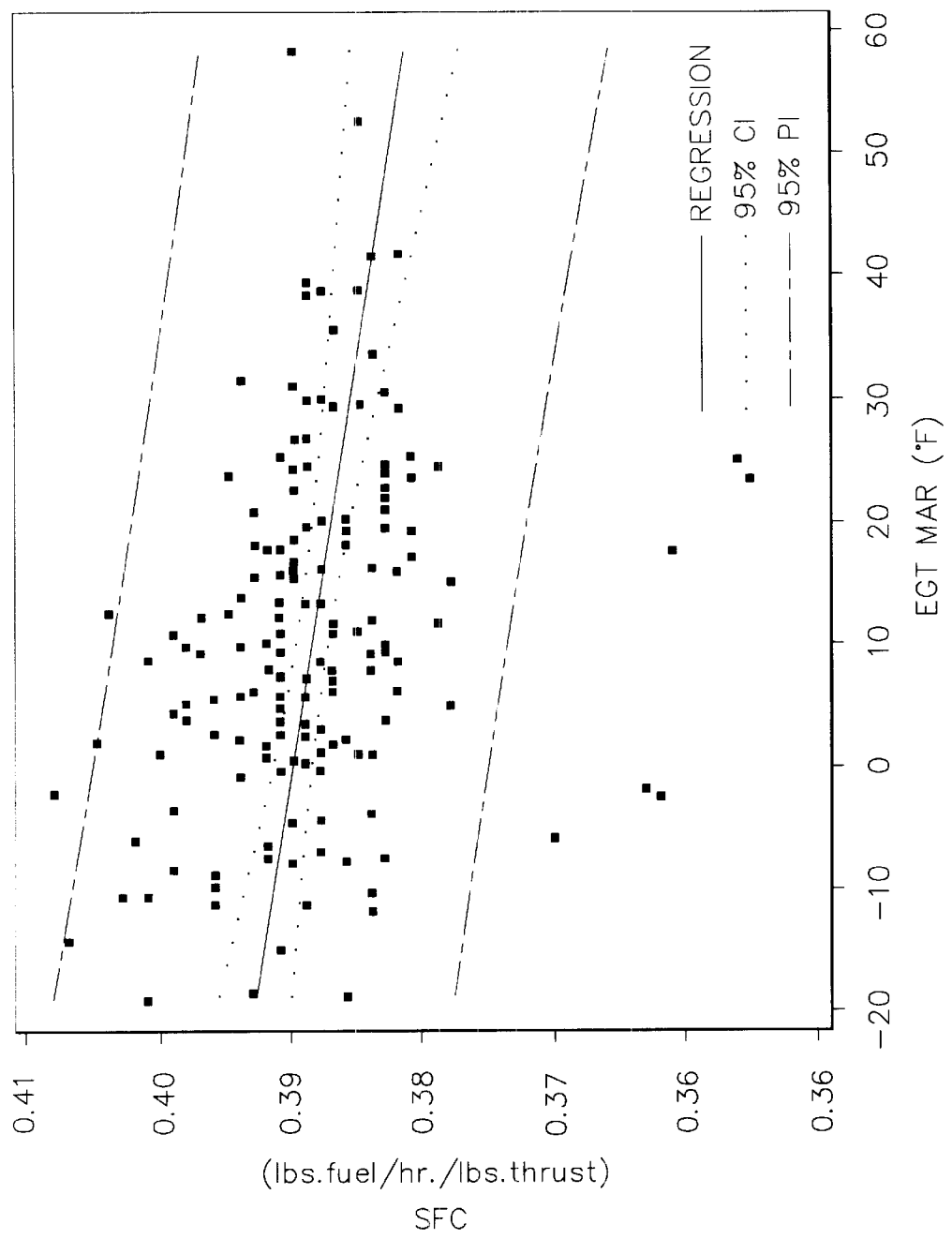
FIG. 9 is a representative fitted line plot of SFC values generated at a maximum continuous power level (MCT) versus EGT margin (MAR) values.

As shown in step 204, the SFC fitted line plot and the trend of the residual SFC plot are found to agree. Accordingly, as shown in step 205, the SFC of the engine is evaluated relative to another performance parameter (in this case the EGT) to provide one or more fitted line plots (SFC v. EGT) that are compared to the SFC trend plot. See FIGS. 8 and 9 which show representative fitted line plots of SFC values generated at a take off (TKOF) and maximum continuous (MCT) power levels versus EGT margin (MAR) values. (In FIGS. 7 and 8, the solid line represents the center line (regression) obtained for the plot; the dotted lines represent the 95% confidence level (95% CI) of the plot; the dotted-dashed lines represent the 95% prediction level (95% PI) of the plot.) See also FIGS. 10 and 11 which show representative horizontal line plots of the differences (residuals) in SFC TKOF values and SFC MCT values at EGT MAR obtained from the fitted line plots of FIGS. 8 and 9, respectively. As shown in step 206, the EGT data is found to not support the SFC trend plot. Accordingly, as shown in step 207, two other engine performance parameters (engine thrust and fan speed) of the engine are evaluated to obtain a fitted line plot (Thrust v. Fan Speed) that is compared to the SFC trend plot. As shown in step 208, the fitted line plot Thrust v. Fan Speed is found to agree with the SFC trend plot. Accordingly, as shown in step 209 another engine performance parameter (engine airflow) of the engine is evaluated relative to engine thrust to obtain a fitted line plot (Airflow v. Thrust) that is compared to the SFC trend plot. As shown in step 210, the fitted line plot Airflow v. Thrust is found not to agree with the SFC trend plot. Accordingly, as shown in step 211, the SFC of the engine is evaluated relative to fan speed to obtain a fitted line plot (Fuel Flow v. Fan Speed) that is compared to the SFC trend plot. This allows evaluation of fuel consumption independent of thrust.

Figure 12:
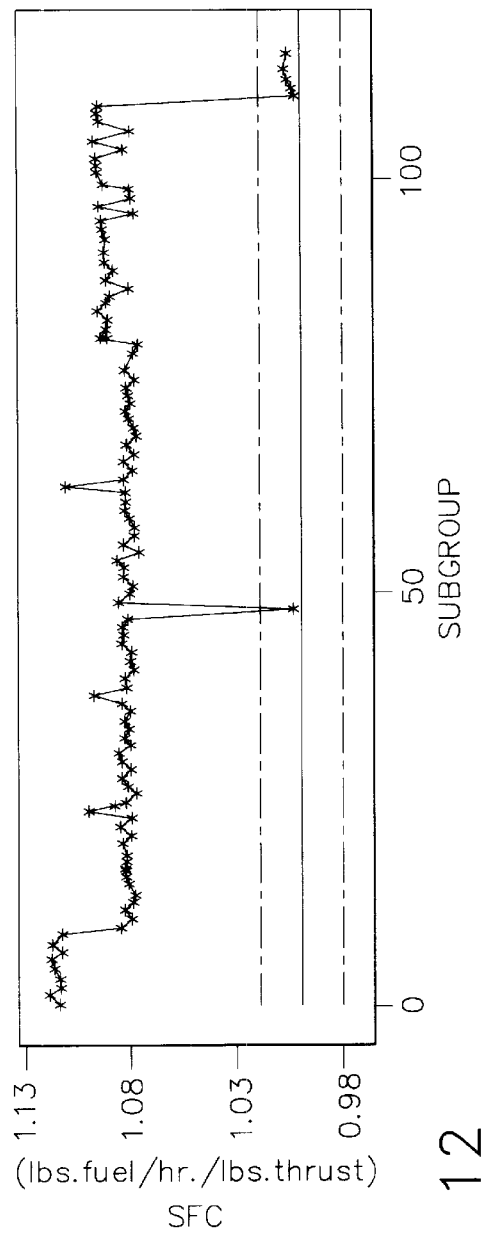
FIG. 12 is a representative horizontal line plot of SFC TKOF values versus SFC Calc. for a test cell.
Figure 13:
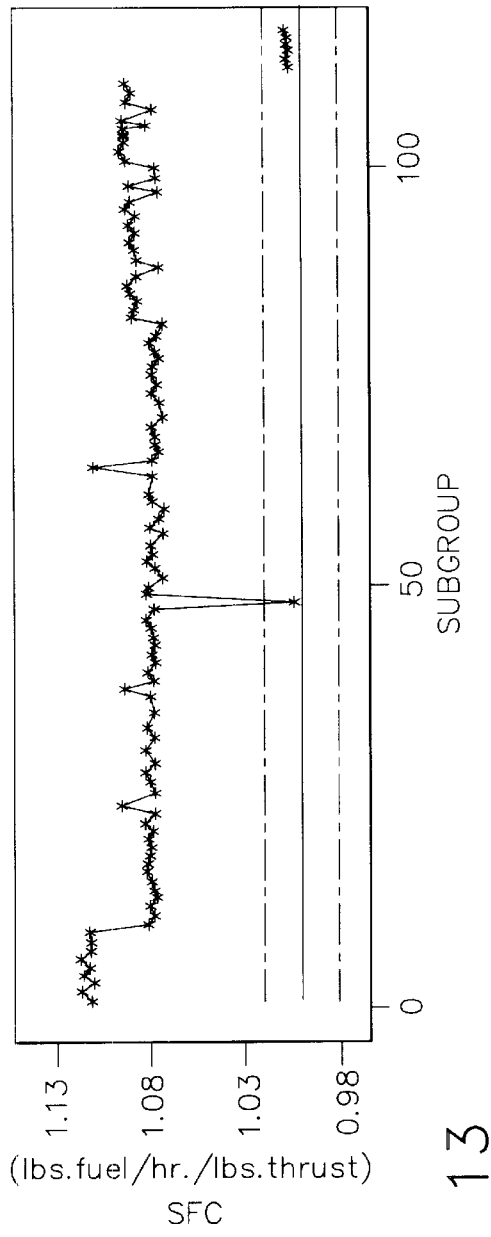
FIG. 13 is a representative horizontal line plot of SFC MCT values versus SFC Calc. for the same test cell as FIG. 12.

As shown in step 212, the fitted line plot Fuel Flow v. Fan Speed is found to agree with the SFC trend plot. Accordingly, as shown in step 213 (see FIG. 3) the fuel flow of the engine is evaluated relative to the EGT to obtain a fitted line plot (Fuel Flow v. EGT) that is compared to the SFC trend plot. As shown in step 214, the fitted line plot Fuel Flow v. EGT is found not to agree with the SFC trend plot. This suggests that the fault detected in step 202 is unrelated to engine performance. As a result, and as shown in step 215, the SFC data is evaluated relative to the SFC adjustment factor for each of the test cells used to generate the data to obtain a fitted line plot (SFC v. SFC Calc.) that is compared to the SFC trend plot. As shown in step 216, the fitted line plot SFC v. SFC Calc. is also found to not to agree with the SFC trend plot, suggesting that the fault detected is related to a cell specific problem. As shown in step 217, each test cell is checked. As shown in step 218, a cell specific problem relating to the SFC adjustment factor is discovered for a particular test cell. See FIGS. 12 and 13 which show representative horizontal line plots of SFC TKOF and SFC MCT values versus SFC Calc. for the test cell that has the problem. As shown in step 219, the appropriate change(s) is made in the SFC adjustment factor for the particular test cell.

Figure 14:
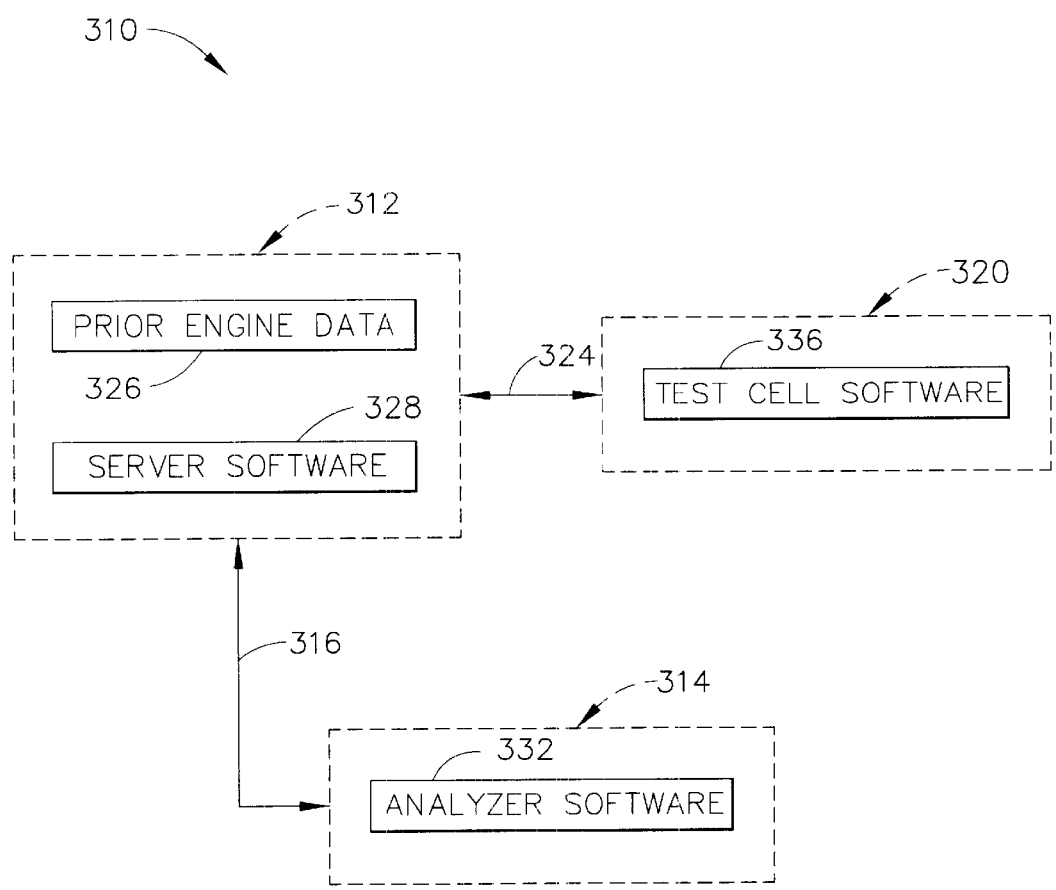
FIG. 14 is a block diagram of a computerized system for carrying out the method of the present invention.

FIG. 14 shows an embodiment of a computerized system indicated generally as 310 for implementing the method of the present invention, especially where the test cell is remote from the analyzer performing the evaluation of the engine in the test cell. System 310 includes a host computer, typically in the form of a server or main frame computer (or multiple servers or main frame computers depending on the type and number of host computers involved) indicated generally as 312, as well as an analyzer workstation used by the analyzer indicated generally as 314. Workstation 314 is shown as communicating with server 312 via a communications pathway indicated generally as 316 that can use Internet or web-based transmission methods, cable television or other cable networks or cable-linked systems, or wireless telecommunications network-based transmission methods, Local or Wide Area Network (LAN or WAN)-based transmission methods, or any other suitable remote transmission method that is wired, wireless or a combination thereof. Workstation 314 can be a variety of electronic devices such as a personal desktop computer, personal digital assistant (PDA), a portable laptop computer, a palm pilot, a cellular or other portable phone, or the like.

Also included in system 310 is the test cell for evaluating the gas turbine engine that is indicated generally as 320 and is shown as being connected to server 312 by a communications pathway indicated generally as 334. Like communications pathway 316, communications pathway 334 can use Internet or web-based transmission methods, cable television network or wireless telecommunications network-based transmission methods, Local or Wide Area Network (LAN or WAN)-based transmission methods, or any other suitable remote transmission method that is wired, wireless or a combination thereof. Although not shown, test cell 320 can include or be associated with a server, main frame computer, personal desktop computer, portable laptop computer or the like that allows for the collection and processing of data generated during the evaluation of the engine. Also, server 312, workstation 314 and test cell 320 can be in the same location, or can be a different locations relatively remote from each other.

As shown in FIG. 14, the prior engine data generally indicated as 326 can be stored on server 312 or can be stored on another computerized system in communication with server 312, workstation 314 and/or test cell 320. Server 312 typically has software indicated generally as 328 that resides thereon and controls access to prior engine data 326, and in particular is capable of providing the ability to communicate with workstation 314 and test cell 320 and to process data transmitted from at least one of workstation 314 and test cell 320 generated during the evaluation of the engine in test cell 320. Workstation 314 also typically has software indicated generally as 332 residing thereon that interfaces with or otherwise permits electronic communication between workstation 314, server 312 and test cell 320, and in particular is capable of transmitting data (including prior engine data 326 residing on server 312) between at least the workstation 314 and server 312 (and potentially test cell 320 as well), so that the analyzer can perform the evaluation of the engine in test cell 320 according to the method of the present invention. Test cell 320 (or its associated computer and electronic devices) can also have software indicated generally as 334 associated therewith or residing thereon that interfaces with or otherwise permits electronic communication between test cell 320, server 312 and workstation 314, and in particular is capable of transmitting data from test cell 320 to at least server 312 (and potentially workstation 314), as well as receiving and processing data from workstation 314, so that the analyzer can perform the evaluation of the engine in test cell 320 according to the method of the present invention.

The present invention can also be provided in the form of downloadable or otherwise installable software that can be used in system 310, and in particular as the combination of the server software component 328 (used with server 312), the analyzer software component 332 (used with workstation 314) and the test cell software component 336 (used with test cell 320 and/or its associated computer devices). This software, as well as the various software components, can be provided or associated with a set of instructions for downloading or installation of the software on the system and/or use of the software with the system that are written or printed on one or more sheets of paper, in a multi-page manual, at the location where the software is located for remote downloading or installation (e.g., a server-based web site), on or inside the packaging in which the software is provided or sold, and/or on the electronic media (e.g., floppy disk or CD ROM disk) from which the software is loaded or installed, or any other suitable method for providing instructions on how to load, install and/or use the software.

While specific embodiments of the method, system and software of the present invention have been described, it will be apparent to those skilled in the art that various modifications thereto can be made without departing from the spirit and scope of the present invention as defined in the appended claims.

What is claimed is:

1. A method for evaluating whether faults detected during the testing of a gas turbine engine are related to engine performance problems or to problems unrelated to engine performance, the method comprising the steps of:

(A) comparing a first set of current engine data to a first set of prior engine data for one performance parameter of the engine under one performance condition to determine if there is an abnormality;

(B) if an abnormality is detected after comparing the first set of current engine data to the first set of prior engine data, comparing a second set) of current engine data to a second set of prior engine data for at least two different performance conditions to determine if there is an abnormality;

(C) after comparing the second set of current engine data to the second set of prior engine data to determine if there is an abnormality:

(1) if an abnormality is detected, evaluating whether the abnormality is a fault unrelated to the performance of the engine;

(2) if an abnormality is not detected, comparing a third set of current engine data to a third set of prior engine data for at least one other engine performance parameter under at least one performance condition to determine if there is an abnormality.

2. The method of claim 1 which comprises the further step of:
(D) after comparing the third set of current engine data to the third set of prior engine data to determine if there is an abnormality:
(1) if an abnormality is detected, evaluating whether the abnormality is a fault unrelated to the performance of the engine;
(2) if an abnormality is not detected, evaluating whether the abnormality detected in step (B) is a fault related to performance of the engine.

3. The method of claim 2 wherein the one engine performance parameter in step (A) is exhaust gas temperature, specific fuel consumption, compressor rotor speed, fan rotor speed, engine air flow, cooling flow, bleed flow, leakage flow, thrust at rated power, compression pressure ratio, turbine pressure ratio, fan pressure ratio, engine pressure ration, turbine clearance control, compression temperature ratio, variable stator angle, variable bleed door position, vibration, oil consumption or acceleration time.

4. The method of claim 3 wherein the one engine performance parameter during step (A) is exhaust gas temperature or specific fuel consumption.

5. The method of claim 2 wherein the engine performance condition is an engine power level.

6. A method for evaluating whether faults detected during the testing of a gas turbine engine are related to engine performance problems or to problems unrelated to engine performance, the method comprising the steps of:
(A) evaluating one performance parameter of the engine under one performance condition to generate a first set of current engine data;
(B) comparing the first set of current engine data to a first set of prior engine data for the one performance condition of the one performance parameter to determine if there is an abnormality;
(C) if an abnormality is detected after comparing the first set of current engine data to the first set of prior engine data, evaluating the one performance parameter under at least two different performance conditions to generate a second set of current engine data;
(D) comparing the second set of current engine data to a second set of prior engine data for the at least two different performance conditions of the one performance parameter to determine if there is an abnormality;
(E) after comparing the second set of current engine data to the second set of prior engine data to determine if there is an abnormality:
(1) if an abnormality is detected, evaluating whether the abnormality is a fault unrelated to the performance of the engine;
(2) if an abnormality is not detected, evaluating the one performance parameter relative to at least one other engine performance parameter under at least one performance condition to generate a third set of current engine data;
(F) comparing the third set of current engine data to a third set of prior engine data for the at least one other engine performance parameter under at least one performance condition to determine if there is an abnormality;
(G) after comparing the third set of current engine data to the third set of prior engine data to determine if there is an abnormality:
(1) if an abnormality is detected, evaluating whether the abnormality is a fault unrelated to the performance of the engine;
(2) if an abnormality is not detected, evaluating whether the abnormality detected in step (C) is a fault related to performance of the engine.

7. The method of claim 6 wherein the one engine performance parameter in step (A) is exhaust gas temperature, specific fuel consumption, compressor rotor speed, fan rotor speed, engine air flow, cooling flow, bleed flow, leakage flow, thrust at rated power, compression pressure ratio, turbine pressure ratio, fan pressure ratio, engine pressure ration, turbine clearance control, compression temperature ratio, variable stator angle, variable bleed door position, vibration, oil consumption or acceleration time.

8. The method of claim 7 wherein the one engine performance parameter during step (A) is exhaust gas temperature or specific fuel consumption.

9. The method of claim 7 wherein the engine performance condition is an engine power level.

10. The method of claim 6 wherein step (B) comprises the steps of: (1) plotting individual values for the first current engine data and the first prior engine data in order of earliest date collected to latest date collected to provide a data plot; (2) running a statistical analysis on the data plot to determine the center line of the data plot and the statistical control limits below and above the center line.

11. The method of claim 10 wherein step (D) comprises the steps of: (1) plotting each value of the second set of current and prior engine data at one power level relative to each value of the second set of current and prior engine data at a second power level to provide a second data plot; (2) carrying out a regression analysis on the second data plot to obtain a center line for the second data plot and to obtain the difference above or below the center line of the second data plot for each value of the second set of current and prior engine data plotted in the second data plot; and (3) plotting the differences obtained for each value of the second set of current and prior engine data in order from earliest date collected to latest date collected.

12. The method of claim 11 wherein step (E)(1) comprises the steps of: (i) selecting a different second set of current engine data and a different second set of prior engine data; (ii) comparing the different second set of current engine data to the different second set of prior engine data to determine if there is an abnormality; and (iii) after comparing the different second set of current engine data to the different second set of prior engine data: (a) if an abnormality is still detected, evaluating whether the abnormality is a fault unrelated to the performance of the engine; (b) if an abnormality is not detected, proceeding to step (F).

13. A computerized system for evaluating whether faults detected during the testing of a gas turbine engine are related to engine performance problems or to problems unrelated to engine performance, the system comprising:
(A) a host computer;
(B) an analyzer workstation in communication with the host computer;
(C) a test cell for carrying out the evaluation of the engine and in communication with the host computer;
(D) software residing on the host computer for controlling access to prior engine data, for permitting electronic communication with the analyzer workstation and the test cell, and for processing data from at least one of the analyzer workstation and the test cell;
(E) software residing on the analyzer workstation for permitting electronic communication between the test cell, the host computer and the analyzer workstation and for transmitting data between at least the host computer and the analyzer workstation;

(F) software associated with the test cell for permitting electronic communication between the test cell, the host computer and the analyzer workstation and for transmitting data from the test cell to at least the host computer;

(G) the system being capable of allowing the analyzer to:
  (1) compare a first set of current engine data to a first set of prior engine data for one performance parameter of the engine under one performance condition to determine if there is an abnormality;
  (2) if an abnormality is detected after comparing the first set of current engine data to the first set of prior engine data, compare a second set of current engine data to a second set of prior engine data for at least two different performance conditions to determine if there is an abnormality;
  (3) after comparing the second set of current engine data to the second set of prior engine data to determine if there is an abnormality:
    (a) if an abnormality is detected, evaluate whether the abnormality is a fault unrelated to the performance of the engine;
    (b) if an abnormality is not detected, compare a third set of current engine data to a third set of prior engine data for at least one other engine performance parameter under at least one performance condition to determine if there is an abnormality.

14. The system of claim 13 which is further capable of allowing the analyzer to:
  (4) after comparing the third set of current engine data to the third set of prior engine data to determine if there is an abnormality:
    (a) if an abnormality is detected, evaluate whether the abnormality is a fault unrelated to the performance of the engine;
    (b) if an abnormality is not detected, evaluate whether the abnormality detected in (1) is a fault related to performance of the engine.

15. The system of claim 14 wherein the one engine performance parameter in (G)(1) is exhaust gas temperature, specific fuel consumption, compressor rotor speed, fan rotor speed, engine air flow, cooling flow, bleed flow, leakage flow, thrust at rated power, compression pressure ratio, turbine pressure ratio, fan pressure ratio, engine pressure ration, turbine clearance control, compression temperature ratio, variable stator angle, variable bleed door position, vibration, oil consumption or acceleration or time.

16. The system of claim 15 wherein the one engine performance parameter during (G)(1) is exhaust gas temperature or specific fuel consumption.

17. The system of claim 15 wherein the engine performance condition is an engine power level.

18. A computerized system for evaluating whether faults detected during the testing of a gas turbine engine are related to engine performance problems or to problems unrelated to engine performance, the system comprising:

(A) a host computer;
(B) an analyzer workstation in communication with the host computer;
(C) a test cell for carrying out the evaluation of the engine and in communication with the host computer;
(D) software residing on the host computer for controlling access to prior engine data, for permitting electronic communication with the analyzer workstation and the test cell, and for processing data from at least one of the analyzer workstation and the test cell;

(E) software residing on the analyzer workstation for permitting electronic communication between the test cell, the host computer and the analyzer workstation and for transmitting data between at least the host computer and the analyzer workstation;

(F) software associated with the test cell for permitting electronic communication between the test cell, the host computer and the analyzer workstation and for transmitting data from the test cell to at least the host computer;

(G) the system being capable of allowing the analyzer to:
  (1) evaluate one performance parameter of the engine under one performance condition to generate a first set of current engine data;
  (2) compare the first set of current engine data to a first set of prior engine data for the one performance condition of the one performance parameter to determine if there is an abnormality;
  (3) if an abnormality is detected after comparing the first set of current engine data to the first set of prior engine data, evaluate the one performance parameter under at least two different performance conditions to generate a second set of current engine data;
  (4) compare the second set of current engine data to a second set of prior engine data for the at least two different performance conditions of the one performance parameter to determine if there is an abnormality;
  (5) after comparing the second set of current engine data to the second set of prior engine data to determine if there is an abnormality:
    (a) if an abnormality is detected, evaluate whether the abnormality is a fault unrelated to the performance of the engine;
    (b) if an abnormality is not detected, evaluating the one performance parameter relative to at least one other engine performance parameter under at least one performance condition to generate a third set of current engine data;
  (6) comparing the third set of current engine data to a third set of prior engine data for the at least one other engine performance parameter under at least one performance condition to determine if there is an abnormality;
  (7) after comparing the third set of current engine data to the third set of prior engine data to determine if there is an abnormality:
    (a) if an abnormality is detected, evaluating whether the abnormality is a fault unrelated to the performance of the engine;
    (b) if an abnormality is not detected, evaluating whether the abnormality detected in step (2) is a fault related to the performance of the engine.

19. The system of claim 18 wherein the one engine performance parameter in (G)(1) is exhaust gas temperature, specific fuel consumption, compressor rotor speed, fan rotor speed, engine air flow, cooling flow, bleed flow, leakage flow, thrust at rated power, compression pressure ratio, turbine pressure ratio, fan pressure ratio, engine pressure ration, turbine clearance control, compression temperature ratio, variable stator angle, variable bleed door position, vibration, oil consumption or acceleration time.

20. The system of claim 19 wherein the one engine performance parameter during (G)(1) is exhaust gas temperature or specific fuel consumption.

21. The system of claim 19 wherein the engine performance condition is an engine power level.

22. The system of claim 18 wherein the analyzer during (G)(2): (a) plots individual values for the first current engine data and the first prior engine data in order of earliest date collected to latest date collected to provide a data plot; (b) runs a statistical analysis on the data plot to determine the center line of the data plot and the statistical control limits below and above the center line.

23. The system of claim 22 wherein the analyzer during (G)(4): (a) plots each value of the second set of current and prior engine data at one power level relative to each value of the second set of current and prior engine data at a second power level to provide a second data plot; (b) carrys out a regression analysis on the second data plot to obtain a center line for the second data plot and to obtain the difference above or below the center line of the second data plot for each value of the second set of current and prior engine data plotted in the second data plot; and (c) plots the differences obtained for each value of the second set of current and prior engine data in order from earliest date collected to latest date collected.

24. The system of claim 23 wherein the analyzer during (G)(5)(a): (i) selects a different second set of current engine data and a different second set of prior engine data; (ii) compares the different second set of current engine data to the different second set of prior engine data to determine if there is an abnormality; and (iii) after comparing the different second set of current engine data to the different second set of prior engine data: (a) if an abnormality is still detected, evaluates whether the abnormality is a fault unrelated to the performance of the engine; (b) if an abnormality is not detected, proceeds to (G)(6).

25. Software for use in a computerized system for evaluating whether faults detected during the testing of a gas turbine engine are related to engine performance problems or to problems unrelated to engine performance, the system including a server, an analyzer computer in communication with the server, and a test cell for carrying out the evaluation of the engine and in communication with the server; the software comprising:
(A) a server software component that can reside on the server that is capable of controlling access to prior engine data, permitting electronic communication between the analyzer computer and the test cell, and processing data from at least one of the analyzer computer and the test cell;
(B) an analyzer software component that can reside on the analyzer computer and is capable of permitting electronic communication between the test cell, the server and the analyzer computer and transmitting data between at least the server and the analyzer computer;
(C) a test cell software component that can be associated with the test cell and is capable of permitting electronic communication between the test cell, the server and the analyzer computer and transmitting data to at least the server;
(D) the software when used with the system being capable of allowing the analyzer to:
(1) compare a first set of current engine data to a first set of prior engine data for the one performance condition of the one performance parameter to determine if there is an abnormality;
(2) if an abnormality is detected after comparing the first set of current engine data to the first set of prior engine data, a second set of current engine data to a second set of prior engine data for the at least two different performance conditions of the one performance parameter to determine if there is an abnormality;
(3) after comparing the second set of current engine data to the second set of prior engine data to determine if there is an abnormality:
(a) if an abnormality is detected, evaluate whether the abnormality is a fault unrelated to the performance of the engine;
(c) if an abnormality is not detected, evaluate the one performance parameter relative to at least one other engine performance parameter under at least one performance condition to generate a third set of current engine data.

26. The software of claim 25 which is further capable of allowing the analyzer to:
(4) after comparing the third set of current engine data to the third set of prior engine data to determine if there is an abnormality:
(a) if an abnormality is detected, evaluate whether the abnormality is a fault unrelated to the performance of the engine;
(b) if an abnormality is not detected, evaluating whether the abnormality detected in step (2) is a fault related to performance of the engine.

27. The software of claim 26 that is stored and installable from one or more nonvolatile electronic storage media.

28. The software of claim 27 wherein the electronic media are floppy disks or CD ROM disks.

29. The software of claim 26 which has instructions provided or associated therewith for how to use the software with the system, how to install the software on the system, or how to use with and install the software on the system.

30. Software for use in a computerized system for evaluating whether faults detected during the testing of a gas turbine engine are related to engine performance problems or to problems unrelated to engine performance, the system including a server, an analyzer computer in communication with the server, and a test cell for carrying out the evaluation of the engine and in communication with the server; the software comprising:
(A) a server software component that can reside on the server that is capable of controlling access to prior engine data, permitting electronic communication between the analyzer computer and the test cell, and processing data from at least one of the analyzer computer and the test cell;
(B) an analyzer software component that can reside on the analyzer computer and is capable of permitting electronic communication between the test cell, the server and the analyzer computer and transmitting data between at least the server and the analyzer computer;
(C) a test cell software component that can be associated with the test cell and is capable of permitting electronic communication between the test cell, the server and the analyzer computer and transmitting data to at least the server;
(D) the software when used with the system being capable of allowing the analyzer to:
(1) evaluate one performance parameter of the engine under one performance condition to generate a first set of current engine data;
(2) compare the first set of current engine data to a first set of prior engine data for the one performance condition of the one performance parameter to determine if there is an abnormality;

(1) if an abnormality is detected after comparing the first set of current engine data to the first set of prior engine data, evaluate the one performance parameter under at least two different performance conditions to generate a second set of current engine data;

(2) compare the second set of current engine data to a second set of prior engine data for the at least two different performance conditions of the one performance parameter to determine if there is an abnormality;

(3) after comparing the second set of current engine data to the second set of prior engine data to determine if there is an abnormality:
  (a) if an abnormality is detected, evaluate whether the abnormality is a fault unrelated to the performance of the engine;
  (b) if an abnormality is not detected, evaluate the one performance parameter relative to at least one other engine performance parameter under at least one performance condition to generate a third set of current engine data;

(4) comparing the third set of current engine data to a third set of prior engine data for the at least one other engine performance parameter under at least one performance condition to determine if there is an abnormality;

(5) after comparing the third set of current engine data to the third set of prior engine data to determine if there is an abnormality;
  (c) if an abnormality is detected, evaluating whether the abnormality is a fault unrelated to the performance of the engine;
  (d) if an abnormality is not detected, evaluating whether the abnormality detected in step (3) is a fault related to performance of the engine.

31. The software of claim 30 that is stored and installable from one or more nonvolatile electronic storage media.

32. The software of claim 31 wherein the electronic media are floppy disks or CD ROM disks.

33. The software of claim 30 which has instructions provided or associated therewith for how to use the software with the system, how to install the software on the system, or how to use with and install the software on the system.

34. The software of claim 30 which is capable of allowing the analyzer during (D)(2) to: (a) plot individual values for the first current engine data and the first prior engine data in order of earliest date collected to latest date collected to provide a data plot; (b) run a statistical analysis on the data plot to determine the center line of the data plot and the statistical control limits below and above the center line.

35. The software of claim 34 which is capable of allowing the analyzer during (D)(4) to: (a) plot each value of the second set of current and prior engine data at one power level relative to each value of the second set of current and prior engine data at a second power level to provide a second data plot; (b) carry out a regression analysis on the second data plot to obtain a center line for the second data plot and to obtain the difference above or below the center line of the second data plot for each value of the second set of current and prior engine data plotted in the second data plot; and (c) plot the differences obtained for each value of the second set of current and prior engine data in order from earliest date collected to latest date collected.

36. The software of claim 35 which is capable of allowing the analyzer during (D)(5)(a) to: (i) select a different second set of current engine data and a different second set of prior engine data; (ii) compare the different second set of current engine data to the different second set of prior engine data to determine if there is an abnormality; and (iii) after comparing the different second set of current engine data to the different second set of prior engine data: (a) if an abnormality is still detected, evaluate whether the abnormality is a fault unrelated to the performance of the engine; (b) if an abnormality is not detected, proceed to (D)(6).

* * * * *

UNITED STATES PATENT AND TRADEMARK OFFICE
CERTIFICATE OF CORRECTION

PATENT NO. : 6,687,596 B2
DATED : February 3, 2004
INVENTOR(S) : Charles Edward Humerickhouse, Charles Eric Lethander and Ryan Kenneth Vorwerk It is certified that error appears in the above-identified patent and that said Letters Patent is hereby corrected as shown below:

Column 10,
Line 56, after the words "comparing a second set" and before the words "of current engine", the mark ")" should be deleted.

Signed and Sealed this

Fifteenth Day of June, 2004

JON W. DUDAS
*Acting Director of the United States Patent and Trademark Office*